US006948706B1

(12) United States Patent
Wyatt et al.

(10) Patent No.: US 6,948,706 B1
(45) Date of Patent: Sep. 27, 2005

(54) CLOCKSPRING WITH INTEGRAL STRAIN RELIEF

(75) Inventors: Christopher K. Wyatt, Hamilton, IL (US); Patrick A. Bolen, Carthage, IL (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 10/844,408

(22) Filed: May 13, 2004

(51) Int. Cl.[7] .............................. H01R 3/00; F16F 1/14
(52) U.S. Cl. .......................... 267/154; 439/15; 439/164
(58) Field of Search ................................ 267/154–157; 439/15, 620, 164; 185/43; 280/728.2, 731, 280/735; 242/388, 388.5, 407; 74/492, 484 R

(56) References Cited

U.S. PATENT DOCUMENTS

| | | | |
|---|---|---|---|
| 4,696,523 A | | 9/1987 | Schauer et al. |
| 4,813,878 A | | 3/1989 | Schauer |
| 4,925,122 A | | 5/1990 | Bannai |
| 4,975,063 A | | 12/1990 | Ida et al. |
| 5,256,075 A | | 10/1993 | Miyahara et al. |
| 5,655,920 A | * | 8/1997 | Bannai et al. ............... 439/164 |
| 5,772,456 A | | 6/1998 | Ohishi |
| 5,928,018 A | * | 7/1999 | Dumoulin .................... 439/164 |
| 6,264,487 B1 | | 7/2001 | Taniuchi et al. |
| 6,860,745 B1 | * | 3/2005 | Bolen et al. ................. 439/164 |
| 2004/0023536 A1 | | 2/2004 | Maegawa |

FOREIGN PATENT DOCUMENTS

JP 04011541 1/1992

* cited by examiner

Primary Examiner—Douglas C. Butler
(74) Attorney, Agent, or Firm—Blank Rome LLP

(57) ABSTRACT

A clockspring with a housing that includes a stationary member having a first wall and a hub member rotatably coupled to the stationary member having a second wall. A flat cable is wound between the first and second walls. The flat cable has opposite first and second ends with the first end being coupled to the stationary member at a first connection area and the second end being coupled to the hub member at a second connection area. A flexible strain relief member is integrally formed as one-piece with one of the first and second walls proximate one of the respective first and second connection areas with one of the first and second ends of the flat cable being disposed between the flexible strain relief member and the one of the first and second walls.

18 Claims, 2 Drawing Sheets

CLOCKSPRING WITH INTEGRAL STRAIN RELIEF

FIELD OF THE INVENTION

The present invention relates to strain relief for a clockspring flat cable. More specifically, the present invention relates to a flexible strain relief member integrally formed with the clockspring housing to provide cable strain relief and that reduces manufacturing costs by eliminating the step of forming the strain relief member separately from the clockspring housing.

BACKGROUND OF THE INVENTION

Clocksprings are employed in vehicles for electrically connecting steering wheel components, such as an air bag, to the circuitry of the vehicle. Conventional clocksprings include a fixed member and a rotor member with a flat cable disposed therebetween. The flat cable winds and unwinds as the steering wheel of the vehicle is turned causing strain on the cable.

Some conventional clocksprings use a separate tongue in connection with the flat cable to prevent the cable from bending or folding too far. However, these tongues increase manufacturing costs because they must be separately formed from the clockspring housing and then assembled with the housing. Due to molding limitations, forming the tongue and clockspring housing integrally has not been possible because the housing is rigid and the tongue is flexible compared to the housing.

Examples of conventional clockspring housings include U.S. Pat. No. 5,655,920 to Bannai et al.; U.S. Pat. No. 5,256,075 to Miyahara et al.; U.S. Pat. No. 4,696,523 to Schauer et al.; U.S. Pat. No. 4,975,063 to Ida et al.; and U.S. Pat. No. 4,925,122 to Bannai, the subject matter of each of which is hereby incorporated by reference.

SUMMARY OF THE INVENTION

Accordingly, an object of the present invention is to provide a clockspring with a strain relief member integrally formed as one-piece with the clockspring housing.

Another object of the present invention is to provide a clockspring with a strain relief member that reduces manufacturing costs.

Yet another object of the present invention is to provide a clockspring with a strain relief member that is flexible and molded with the substantially rigid housing of the clockspring.

The foregoing objects are generally attained by a clockspring with a housing that includes a stationary member having a first wall and a hub member rotatably coupled to the stationary member having a second wall. A flat cable is wound between the first and second walls. The flat cable has opposite first and second ends with the first end being coupled to the stationary member at a first connection area and the second end being coupled to the hub member at a second connection area. A flexible strain relief member is formed as an integral one-piece member with one of the first and second walls proximate one of the respective first and second connection areas with one of the first and second ends of the flat cable being disposed between the flexible strain relief member and the one of the first and second walls.

The foregoing objects are also attained by a clockspring including a housing that has a stationary member with a first rigid wall and a hub member rotatably coupled to the stationary member that has a second rigid wall disposed within the first wall. A flat cable is wound between the first and second rigid walls. The flat cable has opposite first and second ends with the first end being coupled to the stationary member at a first connection area and the second end being coupled to the hub member at a the second connection area. A first flexible strain relief member is integrally formed as one-piece with the first rigid wall proximate the first connection area with the first end of the flat cable being disposed between the first flexible strain relief member and the first rigid wall. A second flexible strain relief member is integrally formed as one-piece with the second rigid wall proximate the second connection area with the second end of the flat cable being disposed between the second flexible strain relief member and the second rigid wall.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
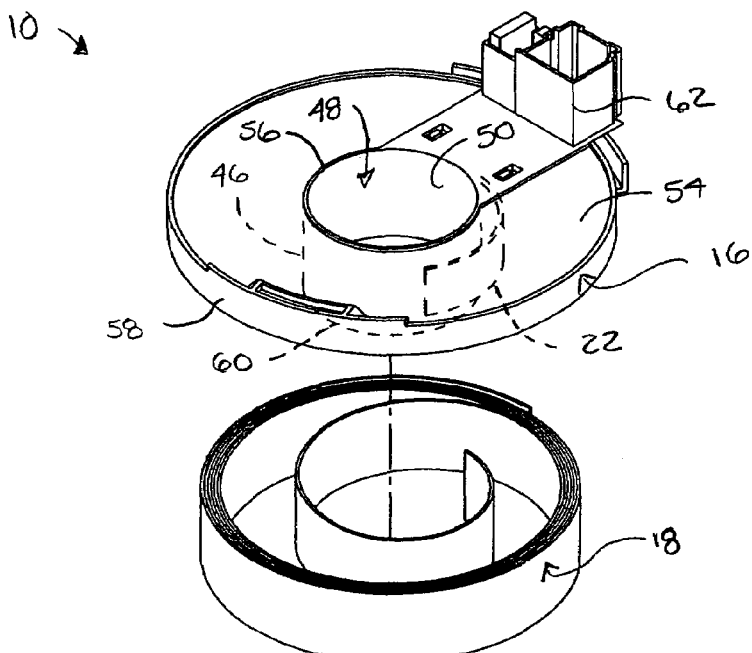
FIG. 1 is an exploded perspective view of a clockspring in accordance with an embodiment of the present invention.
Figure 1:
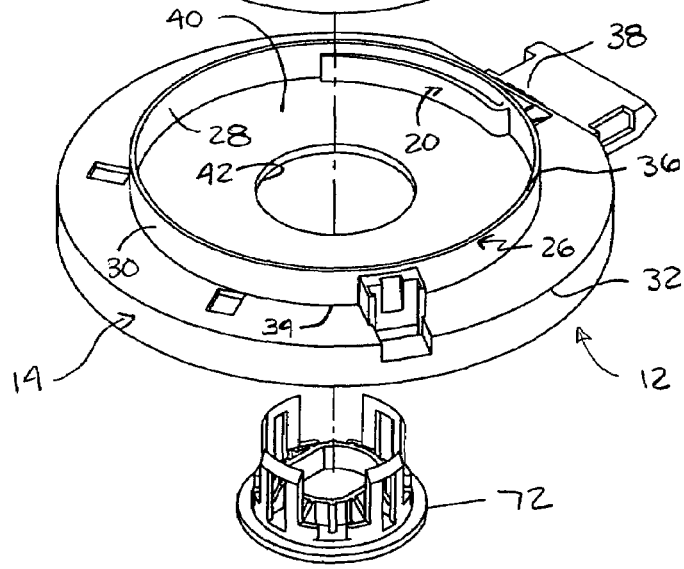

Referring to FIGS. 1–4, a clockspring 10 in accordance with the present invention generally includes a housing 12 having a stationary member 14 fixed to a steering wheel column (not shown) and a hub member 16 which rotations along with the steering wheel, as is well known in the art. A flat cable 18 is wound between stationary and hub members 14 and 16 for electrically connecting equipment installed on the steering wheel, such as an air bag, to chassis-side circuits of the vehicle. Flexible strain relief members 20 and 22 are integrally formed with the stationary and hub members 14 and 16, respectfully, so that they are one-piece with the stationary and hub members 14 and 16. Flexible strain relief members 20 and 22 ensure the appropriate bend radius of flat cable 18 during winding and unwinding as the steering wheel turns. By integrally forming the flexible strain relief members 20 and 22 with members 14 and 16, manufacturing is simplified and costs are reduced since flexible strain relief members 20 and 22 are not separately formed and then attached to members 14 and 16.

As seen in FIG. 1, stationary member 14 includes a substantially cylindrical wall 26 with inner and outer surfaces 28 and 30. Preferably, wall 26 is substantially rigid and formed of a plastic material. A shoulder 32 extends from outer surface 30 at one edge 34 of wall 26 with the opposite edge of wall 26 being a free edge 36. A connector unit 38 extends from shoulder 32 for connection with an electrical cable (not shown). A circular disk 40 is disposed within wall 26 at the edge 34 opposite free edge 36. Circular disk 40 includes a central aperture 42.

Figure 4:
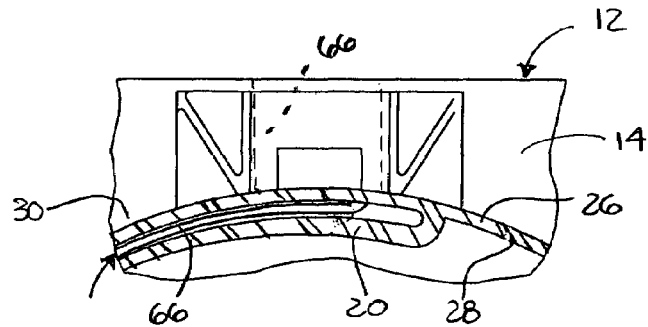
FIG. 4 is a partial plan view in section of the stationary member illustrated in FIG. 4, showing an integral strain relief member of the stationary member.
Figure 3:
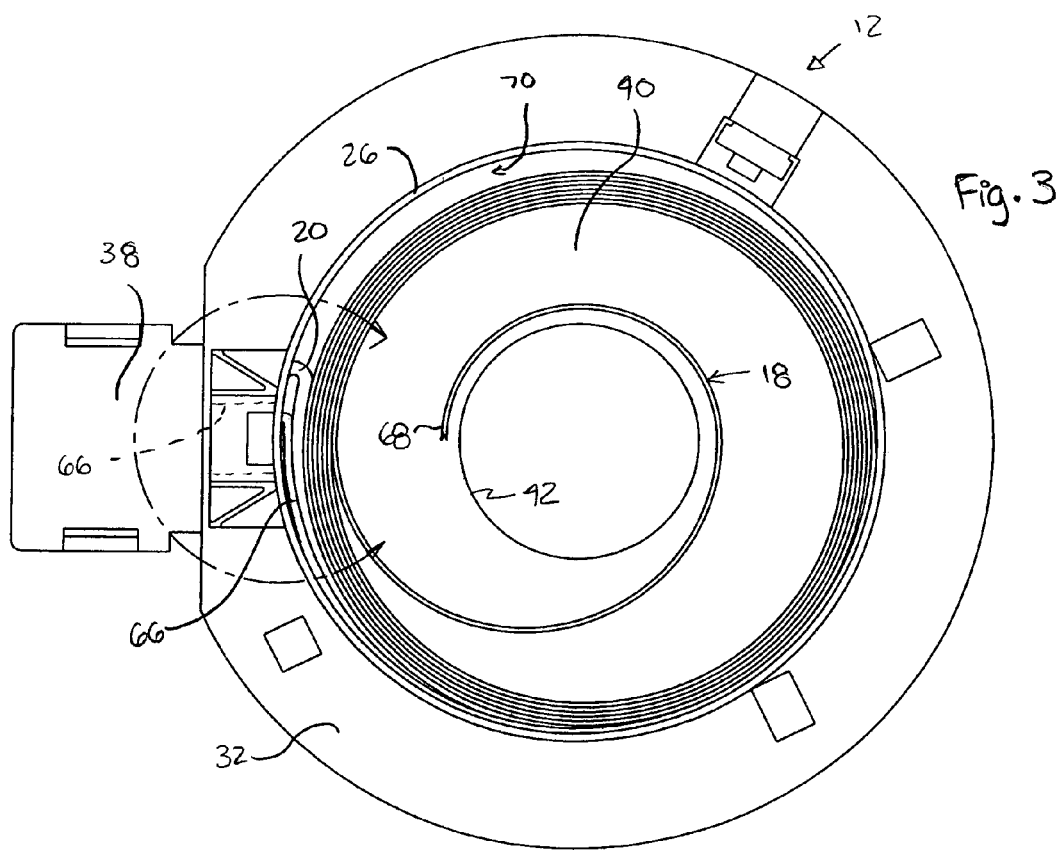
FIG. 3 is a plan view of a stationary member of the clockspring illustrated in FIG. 1, showing the flat cable in the stationary member.

As seen in FIGS. 1, 3 and 4, flexible strain relief member 20 can be a tongue that extends from and along inner surface 28 of wall 26 proximate the area where connector unit 38 extends from shoulder 32. Flexible strain relief member 20 is integrally molded with wall 26 of stationary member 14, as seen in FIG. 4. Although wall 26 is substantially rigid, flexible strain relief member 20 maintains substantial flexibility and elasticity so that flexible strain relief member 20 will flex or move as flat cable 18 abuts strain relief member 20 during winding and unwinding within the clockspring housing 12 preventing flat cable 18 from bending beyond its appropriate bend radius.

Figure 2:
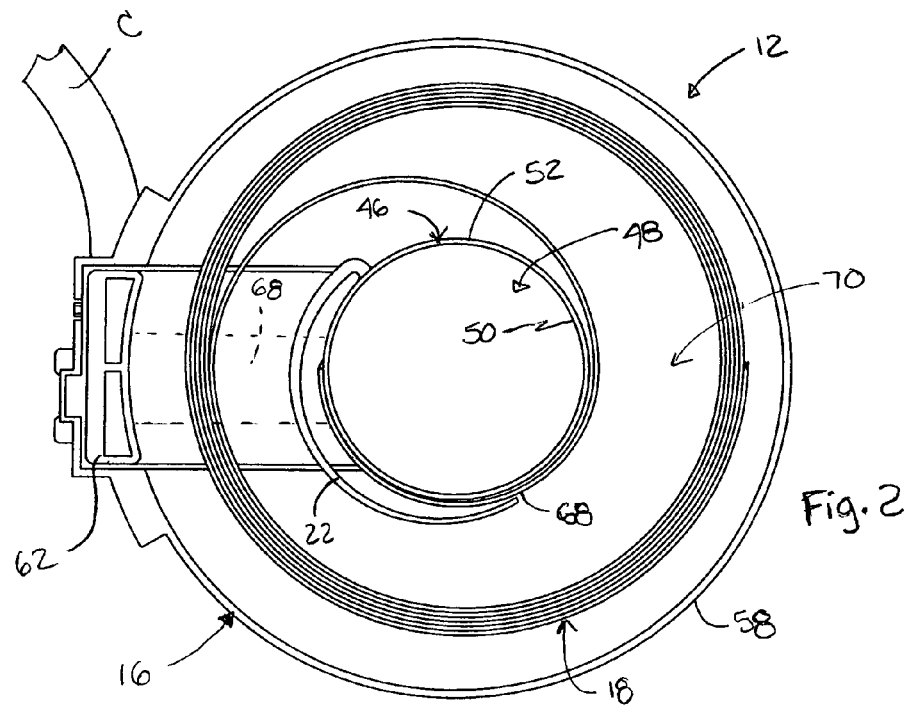
FIG. 2 is a plan view of a hub member of the clockspring illustrated in FIG. 1, showing a flat cable in the hub member.

As seen in FIGS. 1 and 2, hub member 16 includes a substantially cylindrical wall 46 shaped as a hub about which hub member 16 rotates. Cylindrical wall 46 defines an inner passageway 48. Like wall 26 of stationary member 14, wall 46 of hub member 16 is preferably substantially rigid. Wall 46 of hub member 16 includes inner and outer surfaces 50 and 52. A circular disk 54 extends from outer surface 52 of wall 46 at a first edge 56. A second free edge 60 of hub wall 46 opposite free edge 56 abuts circular disk 40 of stationary member 14 and is aligned with central aperture 42 thereof. An outer secondary wall 58 extends around the outer perimeter of circular disk 54. A connection unit 62 extends from secondary wall 58 for connection with an electrical cable C (FIG. 2).

Flexible strain relief member 22 can be a tongue that extends from and along outer surface 52 of wall 46 of hub member 16, as seen in FIG. 2, proximate connection unit 62, that is on the side of wall 46 closest to unit 62. Like flexible strain relief member 20 of stationary member 14, flexible strain relief member 22 is integrally molded with wall 46 of hub member 16 to reduce manufacturing costs and prevent flat cable 18 from bending too far.

When clockspring 10 is assembled, wall 46 of hub member 16 is disposed within wall 26 of stationary member 14. Flat cable 18 is received in a cable retention area 70 defined between walls 26 and 46 and circular disks 40 and 54 of stationary and hub members 14 and 16, respectively. Free edge 36 of stationary wall 26 abuts circular disk 54 of hub member 16. Likewise, free edge 60 of hub wall 46 abuts circular disk 40 of stationary member 14 with inner passageway 48 of hub member 16 and central aperture 42 of circular disk 40 being aligned.

Flat cable 18 includes opposite first and second ends 66 and 68. First end 66 of flat cable 18 is connected to connection unit 38 of stationary member 14. Cable 18 is flat as it extends between circular disk 40 and wall 26 and is folded as it enters cable retention area 70. End 66 of cable 18 is disposed between inner surface 28 of wall 26 and flexible strain relief member 20, as seen in FIG. 4. Second end 68 is connected to connection unit 62 of hub member 16 and extends to wall 46 and into cable retention area 70. Like end 66, cable end 68 is folded as it enters area 70. As cable end 68 extends into area 70, cable end 68 is disposed between outer surface 52 of wall 46 of hub member 16 and flexible strain relief member 22, as seen in FIG. 2. A clip 72 extends through central aperture 42 of wall 26 and into inner passageway 48 of wall 46 to couple stationary and hub members 14 and 16.

In operation, flat cable 18 will wind and unwind within cable retention area 70 as the steering wheel is turned. Since the ends 66 and 68 of flat cable 18 are disposed between flexible strain relief members 20 and 22 and walls 26 and 46, respectfully, flat cable 18 is prevented from bending beyond its appropriate bend radius during winding and unwinding by biasing and restraining the cables ends 66 and 68 towards walls 26 and 28. The flexibility and elasticity of strain relief members 20 and 22 allow the strain relief members to flex as the cable 18 is being wound and unwound. Without strain relief members 20 and 22, the ends 66 and 68 would bend back upon themselves during winding and unwinding.

While a particular embodiment has been chosen to illustrate the invention, it will be understood by those skilled in the art that various changes and modification can be made therein without departing from the scope of the invention as defined in the appended claims. For example, use of both flexible strain relief members 20 and 22 with clockspring 10 is not required, that is only a singe strain relief member 20 or 22 can be used.

What is claimed is:

1. A clockspring, comprising:
   a housing including,
      a stationary member having a first wall,
      a hub member rotatably coupled to said stationary member and having a second wall,
      a flat cable wound between said first and second walls, said flat cable having opposite first and second ends with said first end being coupled to said stationary member at a first connection area and said second end being coupled to said hub member at a second connection area,
      a first flexible strain relief member formed as an integral one-piece member with one of said first and second walls proximate one of said respective first and second connection areas with one of said first and second ends of said flat cable being disposed between said flexible strain relief member and said one of said first and second walls, and
      a second flexible strain relief member being integrally formed with the other of said first and second walls.

2. A clockspring according to claim 1, wherein said first and second walls are substantially cylindrical and concentric with respect to one another.

3. A clockspring according to claim 1, wherein said first wall surrounds said second wall forming a cable retaining area between said first and second walls.

4. A clockspring according to claim 1, wherein said first and second walls are substantially rigid.

5. A clockspring according to claim 4, wherein each of said first and second walls are formed of a rigid plastic material;
   and said first flexible strain relief member is made of a flexible plastic material.

6. A clockspring according to claim 1, wherein said stationary member includes a central aperture aligned with said second wall of said hub member; and
   a clip is received in said central aperture and second wall to connect said stationary member and said hub member.

7. A clockspring according to claim 1, wherein said first wall defines an inner surface facing toward said second wall; and
   said first flexible strain relief member is a tongue extending from said inner surface.

8. A clockspring according to claim 1, wherein said second wall defines an outer surface facing toward said first wall; and said second flexible strain relief member extends from said outer surface.

9. A clockspring, comprising:
a housing including,
   a stationary member having a first rigid wall,
   a hub member rotatably coupled to said stationary member and having a second rigid wall disposed within said first wall,
   a flat cable wound between said first and second rigid walls, said flat cable having opposite first and second ends with said first end being coupled to said stationary member at a first connection area and said second end being coupled to said hub member at a second connection area, and
   a first flexible strain relief member integrally formed as one-piece with said first rigid wall proximate said first connection area with said first end of said flat cable being disposed between said first flexible strain relief member and said first rigid wall, and
   a second flexible strain relief member integrally formed as one-piece with said second rigid wall proximate said second connection area with said second end of said flat cable being disposed between said second flexible strain relief member and said second rigid wall.

10. A clockspring according to claim 9, wherein
each of said first and second strain relief members are tongues;
said first tongue extends from an inner surface of said first wall; and
said second tongue extends from an outer surface of said second wall.

11. A clockspring according to claim 9, wherein
each of said first and second rigid walls are substantially cylindrical; and
said second wall is disposed within said first wall forming a cable retaining area between said first and second rigid walls.

12. A clockspring according to claim 11, wherein
each of said first and second rigid walls are formed of a rigid plastic; and
each of said first and second flexible strain relief members are formed of a flexible plastic.

13. A clockspring, comprising:
a housing including,
   a stationary member having a first wall,
   a hub member rotatably coupled to said stationary member and having a second wall, said second wall defines an outer surface facing toward said first wall,
   a flat cable wound between said first and second walls, said flat cable having opposite first and second ends with said first end being coupled to said stationary member at a first connection area and said second end being coupled to said hub member at a second connection area, and
   a flexible strain relief member formed as an integral one-piece member with one of said first and said second walls proximate one of said respective first and second connection areas with one of said first and second ends of said flat cable being disposed between said flexible strain relief member and said one of said first and second walls, and said flexible strain relief member extending from said outer surface of said second wall.

14. A clockspring according to claim 13, wherein
said first and second walls are substantially cylindrical and concentric with respect to one another.

15. A clockspring according to claim 13, wherein
said first wall surrounds said second wall forming a cable retaining area between said first and second walls.

16. A clockspring according to claim 13, wherein
said first and second walls are substantially rigid.

17. A clockspring according to claim 16, wherein
each of said first and second walls are formed of a rigid plastic material;
and said flexible strain relief member is made of a flexible plastic material.

18. A clockspring according to claim 13, wherein
said stationary member includes a central aperture aligned with said second wall of said hub member; and
a clip is received in said central aperture and second wall to connect said stationary member and said hub member.

* * * * *